Patented Sept. 9, 1941

2,255,606

UNITED STATES PATENT OFFICE 2,255,606

MINERAL OIL COMPOSITION AND METHOD OF MAKING THE SAME

László Auer, Corona, N. Y., assignor, by mesne assignments, to Gulf Oil Corporation, Pittsburgh, Pa., a corporation of Pennsylvania No Drawing. Application February 12, 1937, Serial No. 125,516. In Hungary May 19, 1926

11 Claims. (Cl. 252—53)

This invention relates to improved mineral oil compositions, and particularly to compositions comprising a major amount of a mineral oil and a minor amount of a compound comprising within the molecule an acidic inorganic residue and an organic residue, especially esters of inorganic acids, such as di-methyl sulfate, tri-phenyl phosphate, tri-cresyl phosphate, nitro-cresol carbonates and the like; all as more fully set forth hereinbelow and as claimed.

This application is a continuation-in-part of my copending applications Serial No. 143,786, filed October 23, 1926, which issued on February 13, 1940, as U. S. Letters Patent No. 2,189,772; Serial No. 359,425, filed April 30, 1929, which issued on September 10, 1940, as U. S. Letters Patent No. 2,213,944; and Serial No. 446,172, filed April 21, 1930, which issued on September 10, 1940, as U. S. Letters Patent No. 2,213,943.

In my application Serial No. 143,786, I disclosed a process of modifying the physical characteristics, such as viscosity and the like, of various organic isocolloids by means of modifying agents consisting of electrolytes. That application discloses the modification of colloids such as linseed oil, rape-seed oil and mineral cylinder oil, by means of various organic metal compounds, the modification being effected by melting or boiling the ingredients together or mixing them in the cold. It was disclosed that either an increase or a reduction in the viscosity of the original material could be effected and that the final products are useful in the varnish and lacquer industry, in the rubber industry, as well as in all industries which treat artificial substances.

In my application Serial No. 359,425 I disclosed that further investigation had enabled me to indicate some special features of particular series of examples of the main invention, and to add valuable groups of modifying agents which are active in bringing about the changes described in the earlier application. In said application Serial No. 359,425 a number of additional isocolloid starting materials were mentioned, including inter alia linseed oil and castor oil. I further disclosed therein that as modifying agents, I might employ, in addition to those substances mentioned in my application Serial No. 143,786, compounds containing within the molecule an acidic inorganic residue and an organic residue. Included within the list of compounds coming within this general classification were esters of inorganic acids, e. g. di-methyl sulphate, tri-phenyl phosphate, tri-cresyl phosphate and nitro-cresol carbonates. The amount of modifying agent employed was given as normally from 2 to 10 per cent by weight on the starting materials and it was stated that it is not necessary to use more than 30 per cent. In said application Serial No. 359,425, I disclosed the modification of linseed oil by heating it to temperatures of, for example, from 100° to 310° C. with various modifying agents, including tri-phenyl phosphate, either with or without the application of vacuum, to obtain products differing in viscosity from the original oil.

In my application Serial No. 446,172, I disclosed a two-step procedure, in which various isocolloids referred to in my earlier applications were first modified in accordance with the disclosure contained in said earlier applications, as for example by means of esters of inorganic acids, the resultant modified products being then employed as modifying agents for incorporation in the same or other isocolloids. In said application Serial No. 446,172, the isocolloids referred to as starting materials include inter alia, fatty oils, such as linseed oil, castor oil and soya bean oil, and heavy mineral oils containing naphthenic acids, and the mineral oils treated include refined mineral oils which do not contain naphthenic acids, such as thin refined mineral oil. The modifying agents employed in the initial step include those set forth in my two earlier applications Serial Nos. 143,786 and 359,425, for example esters of inorganic acids such as di-methyl sulphate, tri-cresyl phosphate, tri-phenyl phosphate, nitro-cresol carbonates and the like.

In my application Serial No. 446,172 I disclosed specific examples showing the modification of linseed oil with small quantities of modifying agents and the subsequent incorporation of a minor amount of the modified linseed oil product thereby obtained in a major amount of refined mineral oil, for the purpose of increasing the viscosity of the mineral oil and to enhance the value of said oil for lubricating purposes.

The present application is concerned with the modification or thickening of refined mineral oils by means of isocolloids, such as fatty oils, heavy mineral oils containing naphthenic acids, and the like, which have previously been modified by treatment with modifying agents comprising organic esters of inorganic acids. While various esters of various acids, such as di-methyl sulfate and nitro-cresol carbonates, may be employed as initial modifying agents, I have found it advantageous to employ esters of acids of phosphorus. In addition to tri-cresyl phosphate and tri-phenyl phosphate, mentioned in my applications Serial Nos. 359,425 and 446,172, other esters of phosphorus acids are suitable as modifying agents in the initial step. Thus the esters may be aryl esters, such as tri-phenyl phosphate and tri-phenyl phosphite; alkylated aryl esters, such as tri-cresyl phosphate and tri-cresyl phosphite; or alkyl esters such as tri-butyl phosphate, tri-amyl phosphate, tri-butyl phosphite and tri-amyl phosphite. In addition to the tri-esters noted, the corresponding mono- and di-esters may be employed.

As disclosed in my application Serial No. 446,172, the modification of a mineral oil for lubricating purposes is effected by incorporating therein a relatively small amount of a natural or artificial isocolloid containing unsaturated carbon compounds, which has been modified with a still smaller amount of a modifying agent of the character described. Starting materials suitable for the initial modifying treatment are inter alia, fatty oils, tung oil, linseed oil, fish oils (train oils), poppyseed oil, sunflower oil, cottonseed oil, rape-seed oil, soya bean oil, pineseed oil, corn oil, olive oil, castor oil, resins, synthetic resins containing natural resins, products containing the acids of fatty oils and resins, their derivatives, heavy mineral oils containing naphthenic acids, tar, asphalt, goudron (petroleum distillation residue), pitches, certain mineral oil products, animal and vegetable waxes, rubber and rubber-like hydrocarbons, also chemical pure isocolloid bodies such, for instance as styrene etc.

Thus a modified fatty oil product may be prepared by heating 300 parts of linseed oil under vacuum to 280° to 310° C. for 5 hours with 15 parts of tri-phenyl phosphate, thereby obtaining a moderately dark viscous oil. The product thus obtained is incorporated in a relatively large amount of a refined mineral oil, thereby obtaining a thickened mineral oil product containing the ingredients of the original modified linseed oil and inherently containing tri-phenyl phosphate. In the above embodiment of this invention, in lieu of the linseed oil, other organic isocolloid oils such as rape-seed oil, mineral cylinder oil, castor oil, fish oil, sunflower oil, corn oil, mineral oils containing naphthenic acids, pine oil, etc., may be employed, as set forth in my applications Serial Nos. 143,786; 359,425; and 446,172.

In the initial stage the amount of modifying agent employed ordinarily comprises from 2 to 10 per cent by weight of the oil being treated, although larger amounts, up to 30 per cent, may be employed. Temperatures of 100° to 310° C. are useful. In the final stage, the relative proportions of mineral oil and modified oil product obtained in the first stage will, of course, vary in accordance with the degree of thickening desired and with the physical properties of the initial modified oil product obtained in the first step. In general, however, relatively small amounts of the modified fatty oil products are employed in comparison with the amount of mineral oil employed, for example, 100 parts by weight of mineral oil and from 2 to about 20 parts by weight of a modified fatty oil product. Lower temperatures may be employed in the second step.

For example, 100 parts by weight of a refined mineral oil is heated to 160° C. with 3 parts of linseed oil solidified by said 5 per cent of a suitable modifying agent, thereby obtaining a modified mineral oil product of higher viscosity than the original mineral oil.

The final mineral oil products inherently contain minor quantities of said modifying agents in unchanged form and represent modified products of increased lubricating value with respect to the original mineral oils.

The thickening or increase in the viscosity of lubricating oils obtained in accordance with my invention has considerable importance in industry. It is very important that lubricating oils should not emulsify readily with water and thus be washed out from engines exposed to weather. I have found that solidified oils which contain modifying agents insoluble in water, such as those specified herein, are especially advantageous for use as thickening agents for mineral oils, as the lubricants so obtained do not show any emulsifying capacity with water. When the initial modified oil products are hard enough, or when the percentage dissolved in mineral oil is increased, it is possible to produce pasty or jelly-like materials which can be used as lubricating greases. The incorporation of the modified products in refined mineral oils which do not contain naphthenic acids, has the desirable effect of increasing the disperse phase therein. The invention claimed in this application therefore comprises mineral oil compositions containing modified fatty oils and modifying agents of the character described.

It will be obvious to those skilled in the art that while my invention has been described hereinabove with reference to various specific examples, by way of illustration and exemplification, it may variously be practiced and embodied within the scope of the claims hereinafter made.

What I claim is:

1. A lubricating composition consisting of a refined mineral oil thickened by the incorporation therein of an organic isocolloid modified by an organic ester of an inorganic acid.

2. A lubricating composition consisting of a refined mineral oil thickened by the incorporation therein of a heavy mineral oil containing naphthenic acid and containing tri-cresyl phosphate.

3. A lubricant comprising a hydrocarbon oil and a small quantity of an organic ester of an inorganic acid.

4. A lubricant comprising a hydrocarbon oil and a small quantity of an aryl ester of phosphoric acid.

5. A lubricant comprising a hydrocarbon oil and a small quantity of an alkylated aryl ester of phosphoric acid.

6. A lubricant consisting of a hydrocarbon oil and a small quantity of tri-cresyl phosphate.

7. An improved lubricant comprising a major amount of a hydrocarbon lubricating oil and a minor amount of triphenyl phosphate.

8. A lubricant composition comprising a major amount of hydrocarbon oil and minor amounts of a fatty oil and tricresyl phosphate.

9. A lubricant composition comprising a major amount of hydrocarbon oil and minor amounts of a fatty oil and triphenyl phosphate.

10. An improved grease comprising a hydrocarbon lubricating oil and a thickening agent, having incorporated therein a small amount of tricresyl phosphate.

11. An improved grease comprising a hydrocarbon lubricating oil and a thickening agent, having incorporated therein a small amount of triphenyl phosphate.

LÁSZLÓ AUER.